United States Patent
Haimi-Cohen et al.

(10) Patent No.: US 6,359,971 B1
(45) Date of Patent: Mar. 19, 2002

(54) USER DISPLAY IN SPEECH RECOGNITION SYSTEM

(75) Inventors: Raziel Haimi-Cohen, Springfield; Adam Victor Reed, Morganville, both of NJ (US)

(73) Assignee: American Telephone and Telegraph, Co., Holmdel, NJ (US)

(*) Notice: Subject to any disclaimer, the term of this patent is extended or adjusted under 35 U.S.C. 154(b) by 1581 days.

(21) Appl. No.: 08/524,106

(22) Filed: Aug. 21, 1995

Related U.S. Application Data

(63) Continuation of application No. 08/223,810, filed on Apr. 6, 1994, now abandoned.

(51) Int. Cl.[7] .................................... H04M 3/42
(52) U.S. Cl. ........................... 379/88.01; 704/270
(58) Field of Search ........................... 379/67, 88, 89, 379/88.01, 88.02, 88.03, 88.04; 395/2.79, 2.84, 2.85; 381/43, 110; 704/270, 271, 275, 276, 277

(56) References Cited

U.S. PATENT DOCUMENTS

| | | | |
|---|---|---|---|
| 4,445,001 A | | 4/1984 | Bertoglio ................. 379/183 |
| 4,783,803 A | * | 11/1988 | Baker et al. .............. 381/42 |
| 4,797,910 A | | 1/1989 | Daudelin ................. 379/67 |
| 4,922,519 A | * | 5/1990 | Daudelin ................. 379/67 |
| 5,003,574 A | * | 3/1991 | Denq et al. .............. 379/75 |
| 5,007,081 A | * | 4/1991 | Schmuckal ............... 379/354 |
| 5,033,088 A | * | 7/1991 | Shipman ................. 381/43 |
| 5,054,055 A | * | 10/1991 | Hanle et al. ............. 379/142 |
| 5,111,501 A | | 5/1992 | Shimanuki ............... 379/355 |
| 5,127,055 A | * | 6/1992 | Larkey .................. 381/43 |
| 5,163,083 A | | 11/1992 | Dowden et al. ........... 379/88 |
| 5,204,894 A | * | 4/1993 | Darden .................. 379/88 |
| 5,228,087 A | * | 7/1993 | Bickeston ............... 381/43 |
| 5,230,023 A | * | 7/1993 | Nakano .................. 381/110 |
| 5,257,314 A | * | 10/1993 | Kimura .................. 381/43 |
| 5,329,609 A | * | 7/1994 | Sanada et al. ........... 395/206 |
| 5,357,596 A | * | 10/1994 | Takebayashi et al. ...... 395/2.84 |
| 5,524,137 A | * | 6/1996 | Rhee .................... 379/67 |

OTHER PUBLICATIONS

"Coding Speech at Low Bit Rates", IEEE Spectrum Aug. 1986, pp. 58–63, Jayaut.*

"High Quality Coding of Telephone Speech and Wideband Audio", IEEE Communications Magazine, 1/1990, pp. 10–16, 19–20, Jayaut.*

"Voice Activated Message Handling System for ISDN", Conan, Jul. 1990, pp. 71–77, Electrical Communication, vol. 64 π1.*

"Bicom 4LS Digital Voice Processing System", 1/1991.*

B.L Wattenbarger et al., "Serving Customers With Automatic Speech Recognition—Human–Factors Issues", AT&T Technical Journal, May/June 1993, pp. 28–41.

* cited by examiner

*Primary Examiner*—Scott L. Weaver
(74) *Attorney, Agent, or Firm*—Hedman & Costigan, P.C.

(57) ABSTRACT

A speech recognizer system for use with a telecommunication network wherein an input signal generated onto the network from a first terminal is directed to a speech recognizer for estimating the verbal content of the input signal. The speech recognizer or associated equipment then directs an estimate of the verbal content as an output signal back to the first terminal, the estimate including one or more approximations of the verbal content of the input signal. At the first terminal the user then confirms a correct estimate, or selects from a plurality of approximations, the verbal content of the input signal.

11 Claims, 1 Drawing Sheet

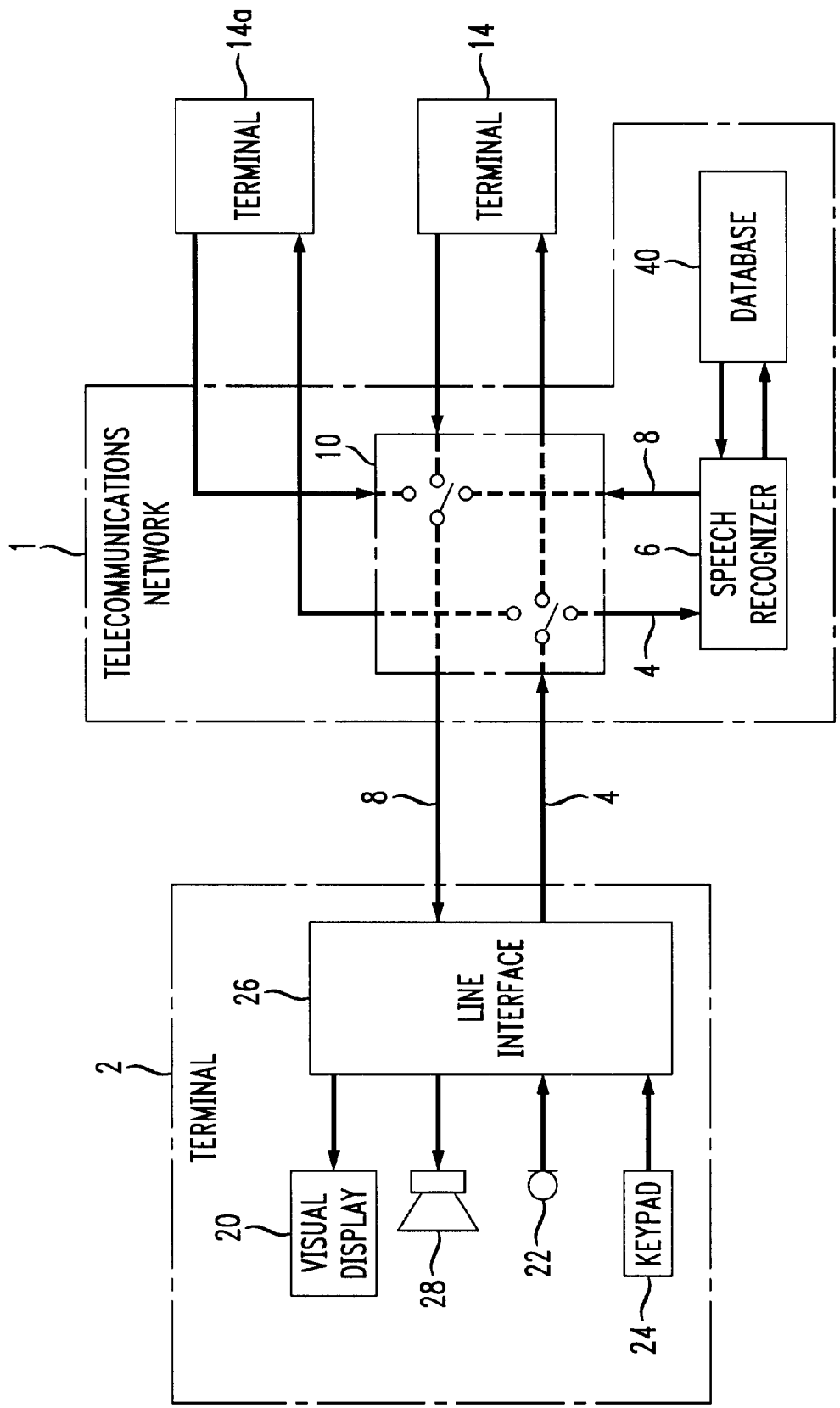

US 6,359,971 B1

USER DISPLAY IN SPEECH RECOGNITION SYSTEM

This application is a continuation of Ser. No. 08/223,810 filed Apr. 6, 1994, abandoned.

FIELD OF THE INVENTION

The present invention relates to the field of voice or speech recognition and more specifically to speech recognition in a network.

BACKGROUND OF THE INVENTION

Speech recognition is the process by which an audio input signal is received and the verbal content of the input signal is determined. The verbal content is then further processed to obtain the desired action. The verbal content can be a transcription of the speech of the input or merely a general statement of content. Additionally, the speech recognizer itself can be located at the user terminal, as in U.S. Pat. No. 5,111,501 or in the network as in U.S. Pat. No. 4,922,519.

Since error exists in the determination of verbal content, systems have been established whereby the user is asked to repeat the request if the speech recognizer is unsure of the content. In this regard, a study of customer interaction with speech recognizers is reported in "Serving Customers With Automatic Speech Recognition—Human-Factors Issues" by Wattenbarger et al, AT&T Tech. J., May/June 1993, pp. 28–41.

SUMMARY OF THE INVENTION

The present invention is directed to a speech recognizer system for use with a network comprising a first terminal from which an input signal is generated onto the network, speech recognizer means for estimating verbal content of the input signal, feedback means for directing an output signal comprising one or more approximations to the first terminal and confirmation means including selection means at the first terminal for confirming the correct approximation.

Preferably, the speech recognition means creates output signals which are digital to increase transmission speed. It is also preferred that the first terminal have a visual display on which to display the estimate, either one approximation at a time, all at once or a number therebetween. Of course, an audio feedback of the estimate may be preferred in such situations as a car phone where the user cannot easily and safely view a visual display or at a terminal without a visual display.

The present invention further includes a method for speech recognition including the steps comprising placing an input signal onto a network, estimating the verbal content of the input signal on the network and transmitting the estimate back to the first terminal for confirmation. Of course, if the speech recognizer is certain of the speech content from the input signal, feedback of an estimate to the first terminal need not be performed.

This invention also provides for error reduction in speech recognition systems comprising the steps of providing an estimate of the verbal content of an input signal to the user and receiving confirmation of a correct approximation from the user.

BRIEF DESCRIPTION OF THE DRAWINGS

The FIGURE is a schematic block diagram of the system of the present invention.

DESCRIPTION OF THE PREFERRED EMBODIMENT

In the preferred embodiment, the present invention is used with a telecommunications network 1 connected to a first terminal 2 from which a user generates an input signal 4 onto the network 1. The input signal 4 is transmitted to a speech recognizer 6, also within the network 1, where an estimate, including one or more approximations of the verbal content of the input signal 4, is made. The estimate of the verbal content is converted to an output signal 8 which is transmitted back to the first terminal 2 for user confirmation. Once the correct verbal approximation is confirmed by the user at the first terminal 2, the information is processed to complete the exchange, for example as described in U.S. Pat. No. 4,922,519 to Daudelin, incorporated herein by reference.

In its preferred embodiment, the first terminal 2 is an automatic device or a user operated device such as a telephone plugged into the network having a visual display 20 such as Caller I.D. In practice, however, it is understood that any device producing a variable signal on the network can be used.

Preferably, a user is able to speak into the microphone 22 of a telephone, for example, to recite a desired number to be dialed, to recite whether a call is to be collect, charged to a calling card, person-to-person, etc., to recite a person's name for which a number is requested or to provide other information. The speech is generated onto the network as an input signal 4, either in analog or digital format depending on the equipment making up the first terminal line interface 26.

Within the network 1 is a speech recognizer 6 which receives and processes the input signal 4. A suitable speech recognizer is a CONVERSANT CVIS, manufactured by AT&T.

If the speech recognizer 6 is sure of the verbal content of the input signal 4 (greater than a predetermined percent certain, e.g. >90% certain) the speech recognizer 6 passes the information to the switch 10 or other processing device as required. If, however, the speech recognizer 6 is not sure of the verbal content of the input signal 4 it will provide an estimate of the verbal content in an output signal 8, comprising one or more approximations of the verbal content, to the first terminal 2 for confirmation of the estimate or selection of an approximation.

Preferably, the first terminal 2 has a visual display 20 and the output signal 8 is in a digital format when sent to the first terminal 2 to speed the movement of the output signal 8 on the network to the first terminal 2. The display 20 of the terminal 2 will then decode the signal 8 and visually present it to the user. Preferably the terminal will have a modem to decode the digital signal for presentation. Alternatively, the output signal 8 will be in DTMF, which can be used with most all current terminal system, that is decoded and presented in visual form at the terminal.

At the first terminal 2 the output signal 8 is received and at least a portion thereof, i.e. one approximation, is presented to the user for confirmation. In its preferred embodiment the most probable approximation will be displayed first, followed by the next most probable if the first is not selected or confirmed.

Of course, although a visual display 20 is preferred, the presentation can be audio via a speaker 28, visual or both, with visual alone or in combination with audio being preferred in most instances due to the speed of presentation and reduced need for user alertness where the visual information can stay on a display 20 until the user wishes to remove it, by confirming the correctness or selecting the next approximation.

However, for car phones where the user has his eyes on the road or with telephones that do not have a visual display, audio presentation via speaker 28 is available alone or along with the visual display 20.

In situations where an audio presentation is made, "barge-in" capability is especially important so a user does not need to wait for the end of the audio presentation to confirm a correct approximation or request the next selection. The barge-in feature allows the user to make a confirmation or request another approximation, by depressing a key on the keypad 24 or speaking into the microphone 22 during the presentation, thereby terminating the presentation of the previous approximation without having to listen to the entire presentation.

The preferred visual display 20 can be of any type, including a Caller I.D. where a line or more of alphanumeric text is presented in an LCD display, a P.C. monitor, a CRT display, a vacuum fluorescent display, an LED display, a video telephone, a still image telephone, etc.

In implementing the speech recognition system of the present invention, a communication protocol must be defined for transmitting the output signal 8 from the network 1 to the first terminal 2. Definition of the protocol requires that the variety of possible terminal types and visual displays present in the network be taken into account. Several methods are currently envisioned herein, including a bidirectional protocol, a terminal specific protocol and a unidirectional protocol.

A bidirectional protocol requires that the terminal 2 respond to the network prompt and describe the capabilities of the terminal 2. The network can then direct an output signal 8 to the terminal 2 which matches the capabilities of the terminal 2. For example, if the line interface 26 of the first terminal 2 has a high speed modem, the output 8 will be set faster using the modem protocol. If the terminal 2 is a videophone or still image telephone, the system will generate an output signal 8 comprising a video image for transmission to the visual display 20 terminal 2. If the terminal 2 can display more than one approximation, the estimate may be transmitted by the network for visual display of more than one approximation and prompt the user by synthesized speech, etc., to choose. In the bidirectional protocol a terminal which does not respond to the prompt will be considered to not have any visual display 20 and the output 8 will be in the form of synthesized speech.

With a terminal specific protocol, the network 1 stores a table of the identities of each terminal 2 and utilizes a terminal specific protocol based on the information on the specific terminal. This approach, however, would only be effective in a small network where a network administrator has control over all of the installed terminals.

With a unidirectional protocol the network transmits both a digital feedback for visual display and an audio synthesized speech feedback for audio presentation to the user at the first terminal 2. The format is fixed and the specific terminal can ignore or display the digital feedback for visual display. Of course, this is the most simple protocol, however, it does not allow for customization to specific terminals.

When the presentation is made to the user at the first terminal 2, the user is able to confirm a correct estimate. This includes the ability to indicate that a correct estimate is displayed or request another alternative if additional alternatives are available. If a multi-line display, e.g. a CRT display is used, the confirmation means includes selection means to select from the approximations displayed, to scroll down or bring up a new screen of additional approximations, etc. Such means includes a keypad 24 or a microphone 22 for voice input.

Additionally, the feedback can be augmented with other information resulting from the query of a database 40 with a recognized input or the most closely matching approximations of an input. For example, in a telephone directory application response to an input signal may include an estimate including the most closely matching name or names together with the corresponding telephone numbers. Similarly, in an exchange request the cost of calling each of the approximations can be included. In such applications the confirmation feature can include automatic dialing of the selected approximation or a request for the next screenful of approximations.

EXAMPLE

A user at a first terminal 2, having a visual display 20 comprising a Caller I.D. device, associated with a network 1 which employs a speech recognition facility lifts a handset and dictates a telephone number of another terminal 14 he wishes to be connected to into the microphone 22. An input signal 4 is placed onto the network 1 and is directed to a speech recognizer 6. The speech recognizer 6 estimates the verbal content of the input signal 4, i.e. the telephone number recited by the user, producing an estimate of the verbal content of the input 4 comprising three (3) approximations.

The estimate is coded in a digital format and is transmitted as an output signal 8 in a DTMF format to the first terminal 2. The approximation considered most probable by the speech recognizer is displayed on the Caller I.D. LCD display 20 and a speech synthesized voice recites the number through the speaker 28. If the displayed approximation is the one the user desires, the user depresses the "*" key on the keypad 24 to confirm the number, thereby directing the network to attempt to reach the other terminal 14 associated with that number. A barge-in feature stops the speech synthesized voice when the key is depressed.

If the first approximation displayed is not the correct number, the user depresses the "#" key on the keypad 24 and the next most probable approximation appears. Again, a barge-in feature stops the synthesized voice reciting the first approximation and begins reciting the next approximation when the "#" key is depressed on the keypad 24. When the correct approximation is displayed the user confirms the approximation by depressing the "*" key on the keypad 24 and the call to the other exchange 14 is placed on the network 1.

While the present invention has been described in detail with reference to specific embodiments thereof, it will be apparent to those skilled in the art that various changes and modifications can be made without departing from the spirit and scope of the invention.

What is claimed is:

1. A method of speech recognition in a telecommunication network consisting essentially of the steps of placing an input signal onto the network from a first terminal, estimating the content of the input signal within the network, transmitting an output signal comprising an estimate of the content of the input signal back to the first terminal for confirmation, said estimate comprising more than one approximation of the input signal, and confirming one of the more than one approximation.

2. The method of claim 1 further comprising the step of digitizing the output signal prior to the transmission to the first terminal.

3. The method of claim 1 further comprising visually displaying one or more of the approximations of the content of the input signal at the first terminal.

4. The method of claim 1 wherein the approximations are presented sequentially at the first terminal with a most probable approximation presented first and a successive next most probable alternative presented after said most probable approximation only if the most probable approximation has not been confirmed.

5. The method of claim 1 wherein a plurality of the more than one approximation are simultaneously presented at the first terminal for confirmation.

6. The method of claim 5 wherein the step of confirming one of the more than one approximation comprises activating a means for selecting an approximation.

7. The method of claim 1 further comprising the steps of accessing a database in response to the input signal and providing additional information which relates to the approximations.

8. A method of speech recognition in a telecommunication network consisting of the steps of placing an input signal onto the network from a first terminal, estimating the content of the input signal within the network, transmitting an output signal comprising an estimate of the content of the input signal back to the first terminal for confirmation, said estimate comprising more than one approximation of the input signal, and confirming one of the more than one approximation.

9. A method of speech recognition in a telecommunications network comprising the steps of placing an input signal onto the network from a first terminal, estimating the content of the input signal within the network, determining a presentation capacity available to the first terminal, transmitting an output signal comprising more than one approximation of the content of the input signal consistent with the presentation capacity to the first terminal for confirmation and confirming one of the more than one approximation.

10. The method of claim 9 wherein the step of determining a presentation capacity comprises the steps of prompting the first terminal for the presentation capacity available and transmitting a response to said prompt from the first terminal.

11. A method of speech recognition in a telecommunications network comprising the steps of placing an input signal onto the network from a first terminal, estimating the content of the input signal within the network, transmitting an output signal comprising more than one approximation of the content of the input signal to the first terminal for confirmation, said output signal comprising both visual and aural presentation signals, and confirming one of the more than one approximation.

* * * * *